Jan. 1, 1946.　　　　　F. W. NICHOL　　　　　2,392,256
TYPEWRITER DEMONSTRATOR
Filed April 30, 1941　　　　4 Sheets-Sheet 1

INVENTOR
F. W. Nichol
BY
ATTORNEY

Jan. 1, 1946.    F. W. NICHOL    2,392,256
TYPEWRITER DEMONSTRATOR
Filed April 30, 1941    4 Sheets-Sheet 2
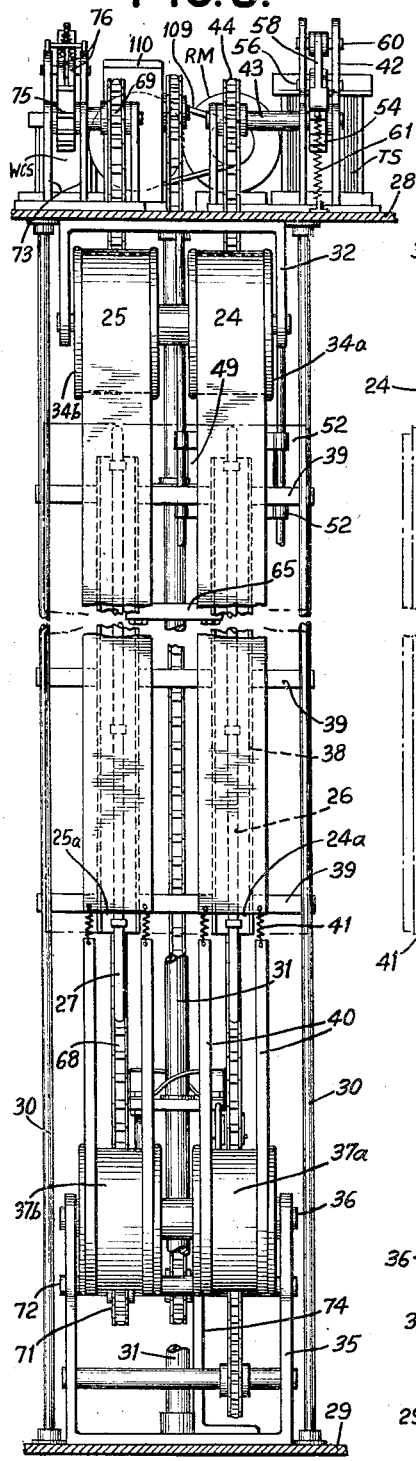
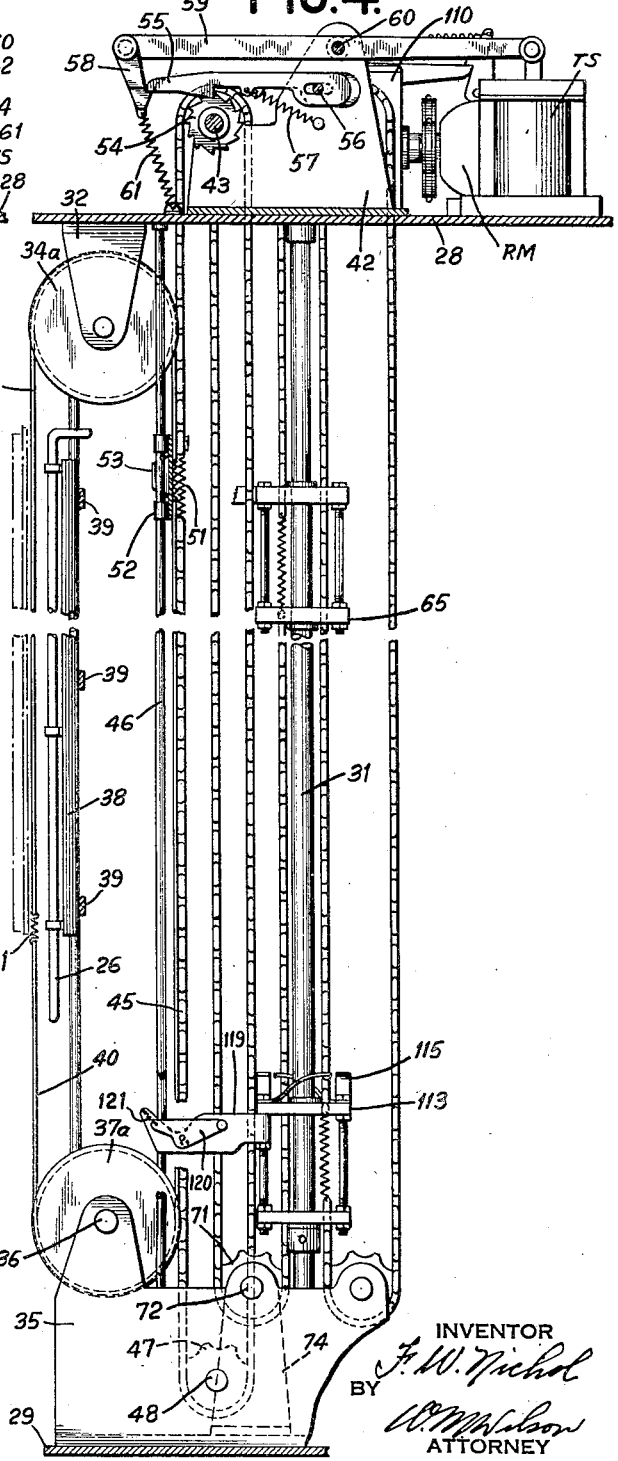

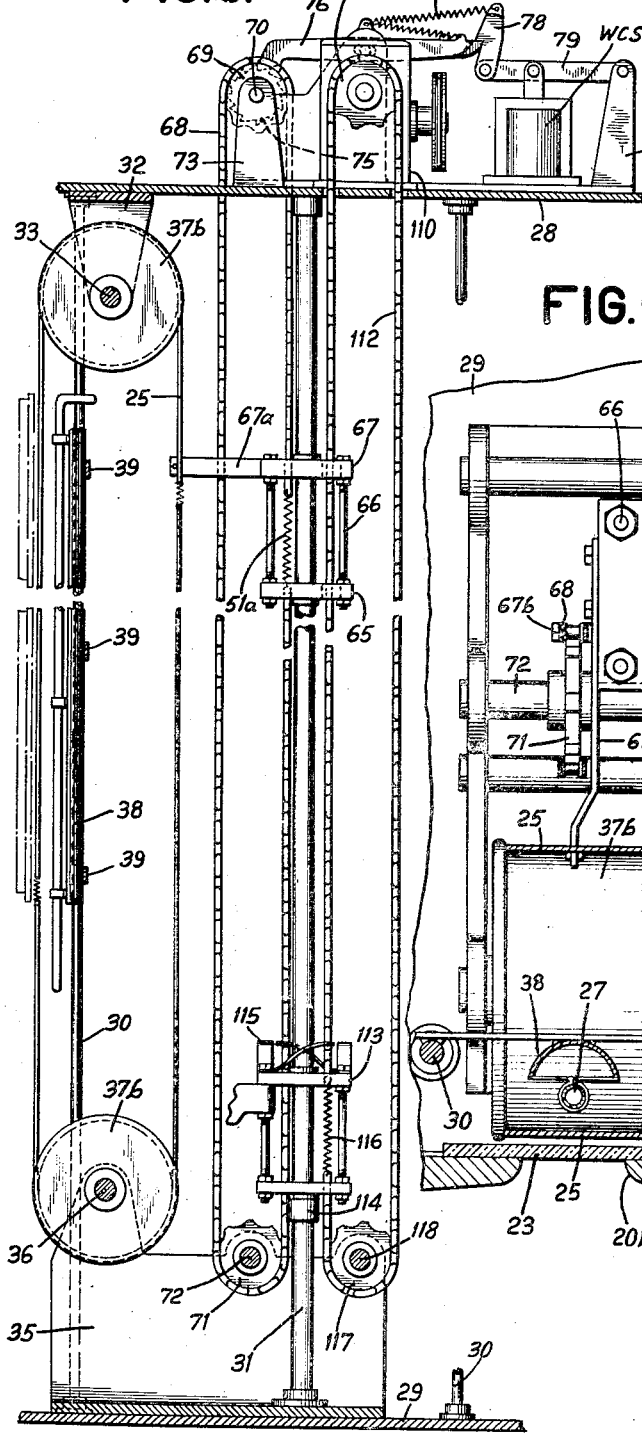
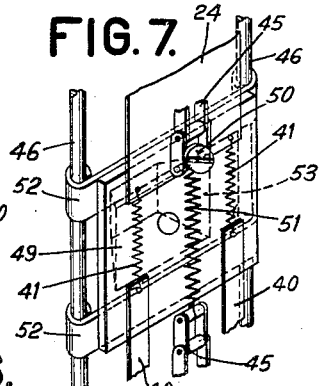
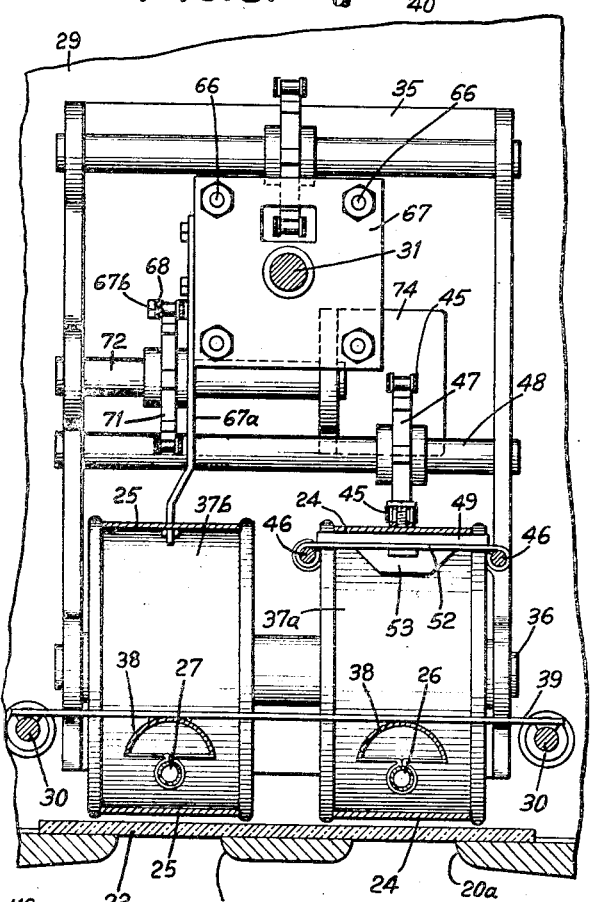

Jan. 1, 1946.  F. W. NICHOL  2,392,256
TYPEWRITER DEMONSTRATOR
Filed April 30, 1941  4 Sheets-Sheet 4
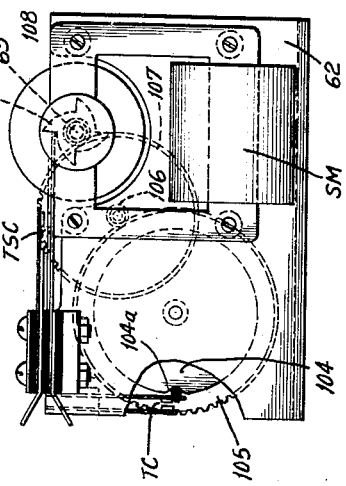
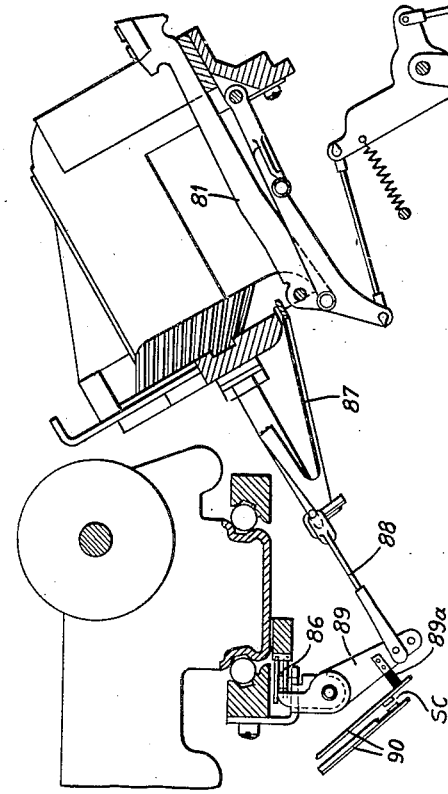
INVENTOR
F. W. Nichol
BY
W. M. Wilson
ATTORNEY Patented Jan. 1, 1946

2,392,256

UNITED STATES PATENT OFFICE 2,392,256

TYPEWRITER DEMONSTRATOR

Frederick W. Nichol, New York, N. Y., assignor to International Business Machines Corporation, New York, N. Y., a corporation of New York Application April 30, 1941, Serial No. 391,088

8 Claims. (Cl. 235—102)

This invention relates to typewriting machines.

The object of the present invention is to provide a device for visually demonstrating the speed of a typewriting machine.

An object is to provide a demonstrator for typewriters which will very graphically impress an observer with the speed of the machine.

An object is to provide a device for demonstrating electric power-operated typewriters.

An object is to provide a device which may be used for demonstration or tests of the speed of a typewriting machine before audiences, such as in a sales room, business show, or exposition exhibit, which will be impressive in its nature and convey to the observer a true appreciation of the speed of the operation of the machine.

An object is to provide a device for comparatively indicating the number of words written and the elasped time.

An object is to provide a device which counts the number of words written and displays the count alongside an indicator showing the time which elapsed in writing the words.

An object is to provide a device for indicating the number of words per minute written by the operator of the typewriting machine.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 is a front elevation of the word counting and time indicating mechanism with the case removed.

Fig. 4 is a right side elevation.

Fig. 5 is a vertical section showing the mechanism for operating the word counting shutter.

Fig. 6 is a horizontal section.

Fig. 7 is a detail of the time indicating shutter.

Fig. 8 is a partial vertical section of a typewriting machine showing certain contacts which control the operation of the word counting shutter.

Fig. 9 is a detail view of an impulse emitting contactor which is used to control the time indicating shutter.

Fig. 10 is a view of a contactor which controls the word counting shutter.

Fig. 11 is a large scale view of the mechanism for advancing the key operation shutter.

Figure 1:
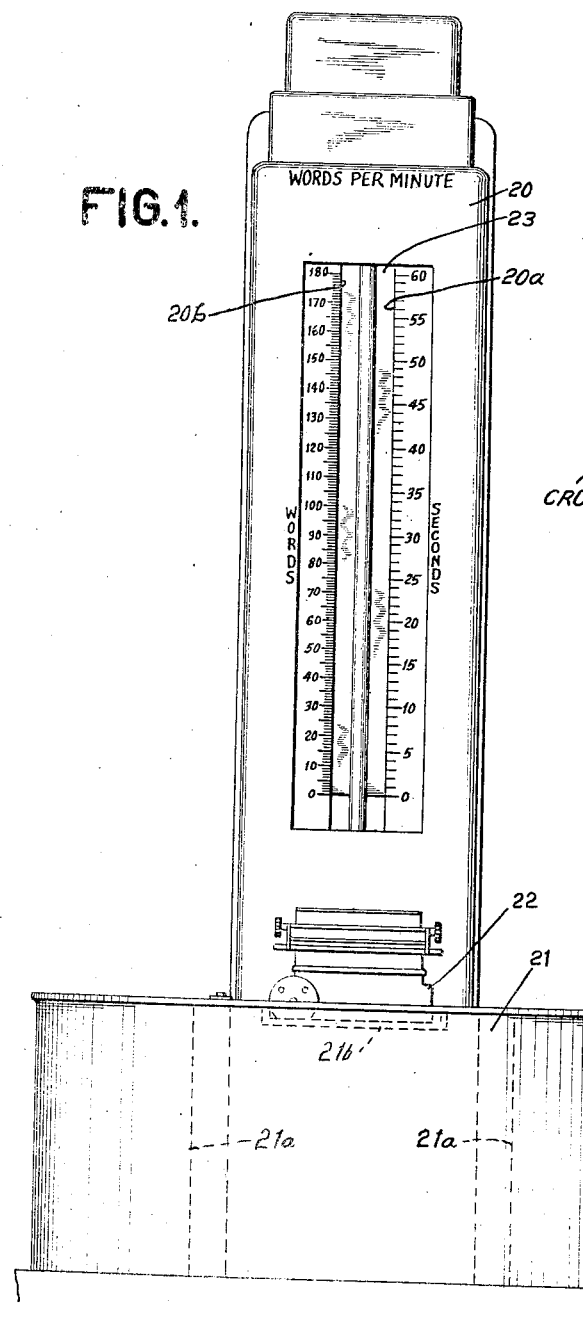
Fig. 1 is a front view of the demonstrator.

The demonstrator comprises a tall pillar like case 20 (Fig. 1) in the front of which is located a counter 21 which is shaped somewhat like a horseshoe in plan with branches 21a and the case 20 is located between the ends of the two branches of the horseshoe. The center of the counter 21 is provided with a depressed open shelf 21b on which is set the typewriting machine 22. Sufficient space is provided between the counter 21 and the case 20 to accommodate a suitable chair on which the operator demonstrating the typewriter may sit. Although not absolutely necessary, the counter and the case 20 may be placed upon a suitable platform or dais 21c so that the operator of the machine and the entire length of the pillar 20 may be easily seen by everyone in a crowd clustered around the demonstrator. This makes the demonstrator suitable for use in sales rooms and exposition booths where audience space is limited and it is necessary for people to get very close to the demonstrator.

The operation of the typewriter 22 controls two indicating devices, one of which is operated continuously over a period of one minute to indicate elapsed time while the other is operated progressively according to the number of key operations of the typewriter 22. The case 20 is provided with two vertical slots, 20a and 20b (Fig. 1) which are closed by a plate 23 (see Fig. 6 also) preferably made of translucent material, such as milky glass or a plastic in sheet form. At the right of the slot 20a, the case is marked at one-second intervals with the graduations numbered at five-second intervals up to sixty seconds. Along the left side of the left hand slot 20b, the case is graduated at one-word intervals marked at ten-word intervals up to 180 words.

Normally the slots 20a, 20b are closed behind the plate 23 by two narrow tapes, or shutters, as they may be called, designated 24 and 25, respectively (Figs. 3 to 6) which shut off the light from two neon lamp tubes 26, 27 disposed vertically directly behind the slots 20a, 20b with the plate 23 intervening. It is preferred that red or orange neon tubes be used in order that the elapsed time and the number of words typed during such time will be visually indicated through the slots 20a, 20b by two vertical streaks of red light to simulate a thermometer.

The mechanism for operating the two tapes or shutters 24, 25 is supported on two plates, 28, 29 (Figs. 3, 4, and 5) which are spaced apart by vertical tie rods 30 and a central guide rod 31. On the upper plate 28 there is mounted mechanism for producing progressive movement of the tapes 24, 25 under control of the typewriting machine. The lower plate 29 supports bearings for the shafts on which are mounted certain sprocket wheels and pawls involved in the driving train for the shutters and the mechanism for restoring the tapes to starting position after a test has been completed. These mechanisms will now be described in detail.

Secured to the underside of the upper plate 28 (Figs. 3, 4, and 5) is a bearing bracket 32 for a shaft 33 on which is loosely rotatably mounted two drums 34a, 34b over which pass the tapes or shutters 24, 25. Secured to the top face of the bottom plate 29 (see Fig. 6 also) is a frame 35 supporting a shaft 36 on which two tape drums 37a, 37b like the drums 34a, 34b are loosely rotatably mounted. The neon lamps 26 extend vertically between the drums 34a, 37a and 34b, 37b attached to reflectors 38 mounted on cross bars 39 secured to the rods 30 as best shown in Fig. 6.

The shutters 24, 25 do not extend completely around both drums 34, 37 but are slightly less than half the length of the endless belt which would be required to pass around both drums. At their ends the shutters 24, 25 are connected to narrower bands 40 (Figs. 3 and 7) by means of springs 41 which maintain tension in the tapes 24, 25 and in the bands 40. It is preferred to make the tapes or shutters 24, 25 and the connecting bands 40 of thin flexible metal, such as phosphor bronze, which has maximum strength with thinness and flexibility. Thus, each of the tapes 24, 25 with the connecting springs 41 and the narrow bands 40 forms a belt which passes around a pair of the drums 34a, 37a and 34b, 37b. The springs 41 maintain the comparatively inelastic metallic tapes 24, 25 and 40 under sufficient tension to keep the stretches of shutters 24, 25 directly behind the translucent plate 23 straight.

At the start of a test, the tapes or shutters 24, 25 are so positioned that they almost completely shut off the light of the neon lamps 26, 27 from the slots 20a, 20b in the case 20 so that no great amount of light can show through such slots. A small amount of leakage of light does occur which causes the strips of plate 23 exposed by the slots to glow softly with a very weak reddish or yellowish hue which is merely decorative and is not arresting to the eye. By driving the tapes 24, 25 in a clockwise direction (Figs. 4 and 5), the trailing edges 24a, 25a (Fig. 3) of the stretch of tapes 24, 25 directly behind the plate 23 are caused to travel upwardly to permit light to pass through the glass 23. Thus, as the tapes or shutters 24, 25 move, an observer will see vertical streaks of red light climbing the slots 20a, 20b in much the same fashion as the red liquid in an alcohol thermometer uses with temperature. For this reason, the demonstrator has been called a "thermometer word counter."

The time shutter 24 is actuated at regular time intervals by a timing mechanism which is controlled by some simple timing instrumentality such as a synchronous motor. However, due to the excessive load which would be imposed upon the synchronous motor, it is not practical to use a synchronous motor to directly drive the tape 24 with sufficient accuracy. Accordingly, the synchronous motor operates contacts which control a magnet operating escapement mechanism to cause the tape 24 to move at quarter second intervals in order to give the tape 24 the appearance of moving at a uniform speed. The word counting tape 25 is driven intermittently by an escapement mechanism which is controlled by contacts operated by the typewriter mechanism.

Secured to the top surface of the top plate 28 is a bearing frame 42 (Figs. 3 and 4) in which is journaled a shaft 43. Secured to the shaft 43 is a sprocket 44 over which passes a sprocket chain 45. This sprocket chain extends downwardly close to the drum 34 over which the time shutter or tape 24 passes and is secured to the shutter 24 in a manner best shown in Fig. 7. Two guide rods 46 extend vertically between the plates 28, 29 parallel with the edges of the shutter 24 and the outer edges of the narrow tapes 40. The chain 45 passes around a sprocket 47 secured to a shaft 48 journaled in the bearing frame 35.

Instead of being directly fastened to the end of the tape 24, one end of the chain 45 is attached to a plate 49 (Fig. 7) by means of a screw 50. The other end of the chain 45, by means of a tension spring 51, is connected to the end which is attached to the plate 49 which spring takes up the slack in the chain and compensates for stretching. The case 20 may be of considerable height, consequently the length and weight of the chains involved in its construction may be sufficient to cause a certain amount of stretch. For this reason, the above or equivalent means of joining the ends of the sprocket chains must be utilized for the chains for both the time shutter 24 and the word count shutter 25.

The plate 49 is secured to two guide members 52 which are bent around the guide rods 46 so as to be freely slidable thereon and to the back of the plate 49 is secured a counterweight 53 most clearly shown in Fig. 6. This counterweight is sufficiently heavy to give the shutter 24 a tendency to move the drum 34a clockwise and to rotate the sprocket 44 counterclockwise with reference to Fig. 4. In order to permit this movement at regular intervals to indicate elapsed time, there is provided an escapement mechanism shown in Fig. 4.

The escapement mechanism is constructed according to principles well known in the typewriter art. Secured to the shaft 43 (Figs. 3 and 4) is a ratchet wheel 54 which conveniently may have twelve teeth although the number of teeth is of no importance. This ratchet wheel is wide enough to be engaged by two pawls 55 pivotally mounted on a cross rod 56 carried by the frame 42, the pawls being provided with short slots embracing the rod 56 whereby the pawls are capable not only of pivotal movement upon the rod 56 but also a sliding movement equal to at least half a tooth space on the ratchet 54. The pawls 55 are provided with springs 57 which tend to draw the pawls to the right in Fig. 4. In one position, shown in Fig. 4, both pawls engage in the same tooth space on the ratchet 54 but the rear pawl is so shaped that in this position its left hand end is clear of a dog 58 pivotally mounted on a lever 59, whereas the left hand end of the front pawl 55 is engaged by the dog. The latter is held in the position of Fig. 4 by a spring 61 anchored to the top plate 28. The lever 59 is pivoted on a cross rod 60 carried by the frame 42 and at its right hand end is connected to the plunger of a solenoid designated TS and hereinafter termed the time solenoid.

When the time solenoid TS is energized with the parts in the position of Fig. 4, the lever 59 is rocked clockwise, thereby lifting the front pawl 55 and disengaging it from the ratchet 54. The tendency of the sprocket wheel 44 is to rotate the ratchet 54 in a counterclockwise direction and draw the dog 55 to the left, this being due, of course, to the effect of the counter weight 53. The slot in the front pawl 55 is so disposed that, with the parts in Fig. 4, the right hand end of the slot in the front pawl 55 acts as a stop to prevent leftward longitudinal movement of the pawl 55 whereby counterclockwise rotation of the ratchet 54 cannot take place until the front pawl 55 is released. When this occurs, the spring 57 for the front pawl draws said pawl to the right and into engagement with the next succeeding tooth in a clockwise direction (Fig. 4) of the ratchet 54. At the time of release of the front pawl 55, the rear pawl 55 is still in engagement with the ratchet 54 but its slot extends to the right of the cross rod 56 the equivalent of half a tooth space on ratchet 54. Consequently, with the release of the front pawl 55, the ratchet 54 is permitted to turn counterclockwise half of a tooth space thereby thrusting the left half end of the rear pawl 55 to the left to a position corresponding to that previously occupied by the front pawl 55. With the restoration of the lever 59 upon deenergization of the solenoid TS, the dog 58 will snap over the end of the rear pawl 55 while the front pawl will be held at the right by its spring 57 far enough for its left hand end to clear the dog 58.

After a cycle of operations commencing with the position of Fig. 4, the teeth on the pawls 55 which engage the ratchet 54 will be separated one tooth space and both will be engaging a tooth on the ratchet 54. However, the ratchet 54 is only permitted to rotate half of a tooth space. Upon the next operation of the lever 59 by solenoid TS, the rear pawl 55 will be raised, the ratchet 54 will thrust the front pawl 55 back to the position of Fig. 4, and the spring 57 for the rear pawl 55 will draw it back to the position of Fig. 4 clear of dog 58.

Figure 2:
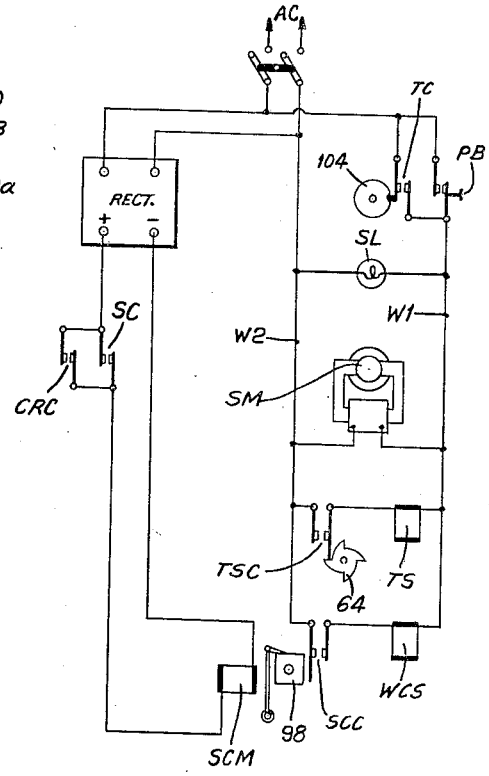
Fig. 2 is a wiring diagram of the electrical controls for the word counter and time indicator.
Figure 1A:
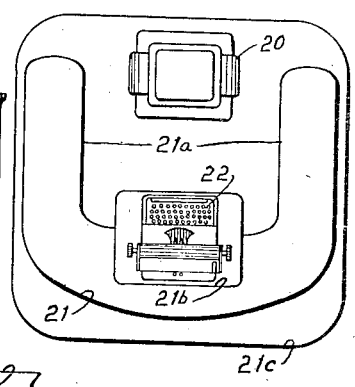
Fig. 1A is a plan view on a reduced scale.

When a demonstration or test is to be carried out magnet TS is energized at regular intervals of time by an elapsed time control mechanism shown in Figs. 2 and 9. This elapsed time control is operated by some convenient form of timing device having a fair accuracy, such as a synchronous motor SM of the type commonly used in electric clocks. This synchronous motor drives a contact device which causes the solenoid TS to be repeatedly pulsed and is shown in Fig. 9. The synchronous motor SM may be mounted on a bracket 62 and its shaft 63 drives a cam 64 at the rate of one revolution per second. The cam 64 may be made of insulating material and has four lobes which operate time solenoid contacts TSC which are in series with the time solenoid TS across the line wires W1, W2 (Fig. 2). Thus, when the circuit including wires W1, W2 is closed and motor SM is in operation the solenoid TS will be energized at quarter second intervals.

The number of pulses of solenoid TS per second is unimportant but, owing to the length of the time tape or shutter 24, it is preferred to move the tape 24 a small amount at short intervals of time rather than a large amount at long intervals in order that the tape may have the appearance of moving at a uniform speed to an observer standing in front of the counter 21. It is, of course, possible to drive the shaft 43 at a uniform rate by means of a synchronous motor or a clock movement but when the word counter is constructed on a large scale, the load is too great for accurate time indication when directly driven by a synchronous motor. Accordingly, it is preferred to utilize a counterweight to operate the time shutter and control the counterweight by relatively light solenoid timed by the synchronous motor.

The word count tape or shutter 25 is operated in the same general way as the time shutter 24. The mechanism for operating the word count tape or shutter 25 is most clearly shown in Figs. 3, 5 and 6. Slidably mounted on the central guide rod 31 is a frame 65 which consists of two castings secured in spaced relation by short tie rods 66. The upper casting 67 is provided with a finger 67a which is secured to the leading or innermost end of the tape 25 whereby, when the frame 65 moves downwardly on rod 31, the tape 25 and left hand drum 34b (Fig. 3) will be rotated in a clockwise direction (Fig. 5) thereby elevating the trailing end of the tape 25 behind slot 20b to expose a column of light in the same manner as the tape 24. The movement of the frame 65 downwardly is controlled by a sprocket chain 68 which passes around a sprocket 69 on an upper shaft 70 and around a sprocket 71 on a lower shaft 72. The upper shaft 70 is journaled in a bearing bracket 73 secured to the top plate 28, while the shaft 72 is journaled in frame 35 and in a bearing bracket 74 (Figs. 3, 4 and 6) secured to the frame 35.

The left hand vertical length of chain 68 is suitably fastened to the top plate 67 as at 67b (Fig. 6) whereby movement of the frame 65 downwardly tends to draw both the word counting shutter 25 and the chain 68 in such a direction as to rotate the drum 34b and sprocket 69 in a clockwise direction. The chain 68, like chain 45, is not continuous but the ends are joined by a tension spring 51a (Fig. 5) which takes up the slack in the chain as in the case of the spring 51 for the chain 45. It is the upper or leading end of chain 68 which is attached to the plate 67 and the other end of the chain is supported only by the spring 51a. The frame 65 is made sufficiently heavy to operate the word count shutter 25.

The movement of the chain 68 and the shutter 25 under the influence of the weight of frame 65 is controlled by an escapement mechanism shown in Fig. 5 which operates according to the same principle as the one in Fig. 4 but the ratchet 75, escapement pawls designated 76 (Fig. 5), springs 77, the dog 78 and the operating lever 79, which are equivalent to the parts 55, 56, 58, 59 (Fig. 4) are different in shape and/or direction of movement. The lever 79 (Fig. 5) is operated by a word solenoid WCS. When the solenoid WCS is energized, the appropriate one of the pawls 76 is released by the dog 78 and the sprocket wheel 69 is allowed to rotate clockwise one-half a tooth space. The solenoid WCS is energized once for each word written by the operator of the typewriter 22.

Conventionally, it is considered that five typed characters or five key impressions comprise a word. Accordingly, means is provided to cause the solenoid WCS to be energized only once for every five key impressions of the typewriter. In conducting typewriter speed contests or demonstrations, it is not customary to include back spacing and tabulating operations, as the tests usually involve the writing of matter which does not necessitate either back spacing or tabulating operations. For instance, columnar work and underscoring are usually not required but simple text is customarily selected for such tests. Accordingly, in the present case only the space bar, character keys, and the carriage return key control the operation of the solenoid WCS.

In Fig. 8 there is shown a partial vertical section of a well known typewriting machine to illustrate how certain contacts which control the solenoid WCS are actuated. The type bars 81 are actuated by double-lobed cam units 82 which cooperate in a well known way with the continually turning power roller 83 under control of the character keys of the machine, one of which is shown broken away and designated 84. The space bar 85 also controls a double-lobed cam unit like 82 which, through connections not shown, actuates the escapement mechanism 86. The escapement mechanism 86 is also actuated by the type bars 81 in a well known way through a universal bar 87 and a link 88 connected to the operating lever 89 of the escapement mechanism 86. The lever 89 is rocked in a clockwise direction, either by the cam unit controlled by the space bar 85, or by the universal bar 87, whenever a character key is depressed to render the corresponding cam unit 82 operative. The lever 89 may be provided with a suitable insulating projection 89a which engages one of a pair of spring contacts 90 so as to close the space contacts SC carried by said members 90 whenever a spacing operation takes place. This will always occur after each character typed and between words and sentences.

It is also desirable that operations of the carriage return key be included. In Fig. 8 is shown the carriage return key CR which controls a single lobe cam unit 82a in the same general fashion as the space bar 85 and the key levers like 84 control their respective cam units 82. When the carriage return key CR is depressed, the cam unit 82a is rendered operative by the power roller 83 in a well known way and effects engagement of a clutch which causes the carriage to be returned by power. The cam unit 82a may be utilized to close contacts CRC carried by spring contact members 91 and for this purpose the frame of the cam unit 82a is provided with an extension 82b engaging an insulating button on one of the spring contact members 91. When the cam unit 82a is rendered operative by depression of the key CR, the rotation of the power roller 83 causes the cam unit 82a to rock in a counterclockwise direction, thereby effecting closure of the contacts CRC.

The mechanism described above is that of the well known "Electromatic" typewriter which also has been known as the "International," but it will be understood that the invention may be applied to other power operated typewriters or to manual typewriters by having the contacts SC, CRC operated by suitable means, such as a bail which is common to all the keys or by some convenient part of the escapement mechanism. It will also be understood that other means in the "Electromatic" may be utilized for operating the contacts SC and CRC than the one shown. For instance, the contacts SC could be operated by the universal bar which actuates the ribbon mechanism in the "Electromatic" typewriter. It will be understood, therefore, that the disclosure in Fig. 8 is purely illustrative and may be varied considerably in details.

For the purpose of controlling the word count solenoid WCS there is provided a stroke counter which is shown in Fig. 10 and includes a stroke counting magnet SCM mounted on a suitable base 92. The magnet SCM actuates an armature 93 pivoted at 92a to the base 92. Pivoted to the upper end of the armature 93 is a pawl 94, formed with a lug 94a which is connected by a spring 95 to a suitable stud on a pillar 96 mounted on the base 92. The pawl 94 engages the teeth of a ratchet 97 secured to a square cam 98, the cam and ratchet 97 being rotatably mounted on a stud 99 carried by the pillar 96. The spring 95 tends to draw the pawl 94 and armature 93 to the left (Fig. 10) but leftward movement thereof is limited by a stud 100 carried by the pillar 96 which also tends to force the pawl 94 into the spaces between the teeth of ratchet 97 to prevent overthrow of the ratchet 97 and cam 98 in a well known way. Rotation of the ratchet 97 in a clockwise direction is prevented by a flat spring detent 101 secured in a slot in a stud 102 riveted to the pillar 96. The rectangular cam 98 operates a spring member 103 having an insulating button engaging one of a pair of contact members supporting contacts SCC which may be termed the stroke counting contacts.

With reference to Fig. 2, the contacts SCC are in series in the word count solenoid WCS across the wires W1, W2 whereby solenoid WCS will be energized whenever contacts SCC are closed provided, of course, the circuit including wires W1, W2 is also closed. The contacts CRC, SC, and the magnet SCM are connected in series-parallel relation across the terminals of a suitable direct current rectifier which may be of the electronic type involving one or more thermionic vacuum tubes. This rectifier may be connected to the same source of alternating current as the circuit including wires W1, W2.

It is desirable to confine a demonstration to a definite period, such as one minute, for various reasons, primarily because of the fact that speeds of typists are usually stated in words per minute, and also to prevent overrunning of the shutters 24, 25, since the word counter is not designed for continuous operation but requires resetting of the shutters after each test. The manner in which the shutters may be reset will be described hereinafter. Any suitable means may be used to time the test but for purposes of illustration there is shown in Figs. 2 and 9 a timing device which serves the purpose and which incidentally makes use of the synchronous motor SM.

The motor SM (Fig. 9) drives a cam 104 journaled on a stud carried by the bracket 62, through the medium of suitable reduction gearing. This gearing comprises a large gear 105 secured to the cam and meshing with a pinion 106 rotatably mounted on a stud carried by the bracket 62, a large gear 107 secured to the pinion 106, and a pinion 108 meshing with gear 107 and secured to the shaft 63 of the synchronous motor SM. The gearing is such that the cam 104 makes one revolution per minute when it is started in operation. The cam 104 has a notch 104a (Fig. 9) engaging a pin or block of insulating material carried by one of the spring contact members supporting contacts TC called the timing contacts which are insulatably mounted on the bracket 62. The contacts TC are normally open but are closed by the cam 104 immediately after the motor SM is started in operation.

With reference to Fig. 2 it will be noted that the line wire W1 is connected to one side of the alternating current source A. C. through the contacts TC, while the line wire W2 is directly connected to the other side of the A. C. source.

Contacts TC are in shunt with the contacts of a suitable push button control switch PB.

The operation of the demonstrator will now be explained in detail. It will be assumed that the shutters 24, 25 are in the positions shown in the drawings in which only a very softened glow, if any, may be seen in the slots 20a, 20b (Fig. 1) of the case 20. The operator starts to operate the typewriter, copying some suitable text which is long enough to take more than one minute to write on the typewriter. Contacts SC (Fig. 8) close with each operation of a type bar or the space bar as explained above and the contacts CRC are closed momentarily each time the carriage return key is operated to return the carriage at the end of a line. The closure of contacts CRC or SC, as the case may be, causes the magnet SCM to be energized repeatedly, thereby effecting rotation of the ratchet 97 and cam 98 in a counterclockwise direction (Fig. 10). Since the ratchet wheel has twenty teeth and the cam 98 only four points or lobes, the contacts SCC will be opened and closed once for each quarter revolution of the ratchet wheel 97 or once for every five operations of the contacts CRC, SC.

In the normal course of operation of a typewriter, the carriage return key and a character key or the space bar will never be operated together. Consequently, one or the other of contacts SC, CRC, but not both, will cause energization of magnet SCM. The closure of contacts SCC once for each five key impressions will not have any immediate effect because the circuit including line wires W1, W2 is normally broken at the contacts TC and the push button switch PB.

After the operator of the machine has got well into her stride and is operating the machine at a steady pace the push button PB (Fig. 2) may be closed. This completes the circuit from source A. C. through the line wires W1, W2 and starts the synchronous motor SM which, of course, commences to turn the cam 64. Thereafter contacts TSC are operated at quarter-second intervals, thereby starting the time tape or shutter 24 into movement which will continue as long as the circuit through line wires W1, W2 is maintained.

The push button switch PB is kept closed until the motor SM has turned the cam 104 (Fig. 9) far enough to close contacts TC whereupon the push button switch may be released. Contacts TC will remain closed until the cam 104 has completed its rotation which will require one minute. The closing of contacts PB also closes the circuits including the signal lamp SL and solenoid WCS and the latter will be energized once for every five key strokes by the closure of the contacts SCC of the stroke counter. The movement of the shutters 24, 25 upwardly causes a bright streak of light to travel up each of the slots 20a, 20b like the rising liquid in a thermometer.

Owing to the small amount of movement of the time shutter per impulse of solenoid WCS and the short space of time in which it is effected, the shutter 24 will travel upwardly at what will appear to the eye a uniform rate of speed whereas the shutter 25 will travel intermittently. However, since the average typist is easily capable of twelve key strokes per second, the intermittent movement of shutter 25 may actually appear to be more continuous and faster than the shutter 24, depending upon the expertness of the typist operating the machine.

This substantially steady rise of the two columns of light, one denoting the passage of time and the other the number of words the machine very graphically illustrates the speed of operation of the machine to people clustered around the counter 21 or in its immediate neighborhood. It has been found to be very effective as a means of arousing interest in the machine by drawing attention to advantages in respect to speed.

After the demonstrator has been used for a test it must be restored to starting position, that is, the shutters 24, 25 must be moved downwardly in front of the neon lights 26, 27 so as to again obscure the lights. This result may be accomplished in a variety of ways but it is preferred to utilize an electric motor for the purpose. This motor is designated RM in Figs. 3 and 4 and is mounted on the top plate 28. The motor is connected by a belt 109 to the speed reducer 110 which drives a sprocket 111 over which passes a chain 112 (Fig. 5). This chain is secured at one end to an elevator frame 113 which is slidably mounted on the guide rod 31 below frame 65. Normally the elevator frame 113 rests upon a collar 114 on the guide rod 31 and is constructed similarly to the frame 65. Secured to the top of the elevator 113 are four leaf springs 115 designed to engage the frame 65. The other end of the chain 112 is connected to a spring 116 which is attached to the first end of the chain and spring 116 takes up slack in the sprocket chain. The sprocket chain 112 passes around a sprocket 117 mounted on a shaft 118 journaled in the bearing frame 35.

When the motor RM is started, the sprocket 111 is rotated in a clockwise direction, thereby, through the chain 112 drawing the elevator 113 upwardly until ultimately it strikes the frame 65 and moves it back to the position of Fig. 5. This restores the word count shutter 25. In order to restore the time shutter 24, the frame 113 is provided with an arm 119 (Fig. 4) which extends between the two narrow tapes 40 which are connected to the time shutter 24 whereby, when the elevator 113 rises, the extension or arm 119 engages the lower edge of the plate 49 and restores the time shutter.

The springs 115 on the elevator 113 reduce the shock of engagement of the elevator with the frame 65 whereby the latter is started gently from rest. A shock absorber also is provided for the arm or extension 119 and consists of an arm 120 (Fig. 4) pivoted on the side of the arm 119 and actuated upwardly by a spring 121 (Fig. 4), the spring 121 holding arm 120 upwardly against a suitable stop not shown. The top edge of arm 119 is deeply recessed near the end of the arm 120 to which the spring 121 is attached whereby, when the elevator 113 moves upwardly, the edge of the arm 120 engages the plate 49 and yields slightly before the wall of the recess in arm 119 engages the plate 49 positively. Thus a gentle pickup of the tape or shutter 24 is effected.

Means for controlling the motor RM have not been shown, but it is contemplated that a suitable form of push button controlled motor reversing circuit utilizing conventional limit switches in a well known way will be provided as a means of starting the motor, limiting the travel of the elevator 113, and causing it to automatically reverse. Such circuits and controls for motors are well known and are commonly provided in machines of various kinds for causing a single excursion or oscillation of a motor driven element such as a planer table or saw mill carriage. Accordingly it is felt that the control of the motor RM may readily be supplied by any person skilled in such matters.

While there has been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention.

What is claimed is:

1. A typewriter demonstrator comprising means to project two columns of light upon a surface and including means to progressively increase the lengths of the columns of light according to elapsed time and in proportion to the number of key operations of a typewriter under test, respectively; and control means for said projecting means including an operation initiating element and duration control means for limiting the duration of the test.

2. A demonstrator for typewriting machines, comprising a time indicator, a typewriter operation indicator, a timing device for advancing the time indicator to indicate elapsed time, typewriter operation controlled means for advancing the operation indicator, a second timing device for determining the duration of a period of operation of the first timing device and the operation controlled means, and means to initiate operation of said timing devices to start said period.

3. In a typewriter demonstration device, two elongated light sources, shutters movable lengthwise of the light sources to progressively expose said sources to create the effect of growing columns of light; graduated fixed scales for measuring the travel of each of said shutters, one scale being graduated proportional to the number of key operations of the typewriter, and the other to increments of a fixed period of elapsed time; means controlled by the keys of the typewriter for moving the shutter for the key operations in proportion to the number of key operations, a timing device, means controlled by the timing device for moving the shutter for the time scale, and means to confine the period of operation of the key operation shutter to the period of time covered by the time scale.

4. In a typewriter demonstration device, two elongated light sources, shielding elements movable lengthwise of the light sources to progressively uncover said sources to create the effect of growing columns of light; graduated fixed scales for measuring the travel of each of said elements, one scale being graduated proportional to the number of key operations of the typewriter, and the other to increments of a fixed period of elapsed time; means controlled by the keys of the typewriter for moving the shielding element for the key operations in proportion to the number of key operations, a timing device, means controlled by the timing device for moving the element for the time scale, and means operated by the timing device for limiting the period of activity of the key operation shielding element to the period comprised by the time scale.

5. In a typewriter demonstration device, two elongated light sources, shutters movable lengthwise of the light sources to progressively expose said sources to create the effect of growing columns of light; fixed scales for measuring the travel of each of said shutters, one scale being graduated proportional to the number of key operations of the typewriter, and the other to increments of a fixed period of elapsed time; means controlled by the keys of the typewriter for moving the shutter for the key operations, in proportion to the number of key operations, a timing device, and means controlled by the timing device for moving the shutter for the time scale, means operated by the timing device for limiting the period of activity of the key operation shutter to the period covered by the time scale, and means to start the timing device into operation.

6. A typewriter demonstrator, comprising means to produce two lengthening columns of light, one proportional to the number of key operations of a typewriting machine and the other to a period of time, means controlled by the operation of the keys of the typewriting machine for operating the key operation means, a timing device, means controlled by said device for operating the other producing means, and means to limit operation of the timing device and producing means to said period of time.

7. A typewriter demonstrator, comprising two means to exhibit lengthening columns of light, the lengths of said columns of light being proportional to the number of key operations and to a period of time of a test respectively, a timing device for operating the exhibiting means for the column denoting said test period, means controlled by the operation of typewriter keys for operating the exhibiting means for the number of operations column, and means to render the last named operating means ineffective when the period column has attained its full length.

8. A demonstrator for typewriting machines comprising a screen and means for projecting two columns of light on the screen the lengths of which columns at any instant are proportional to the number of key operations and elapsed time, respectively, said projecting means including illuminating means and two movable shutters interposed between the screen and illuminating means, means to move the shutters in proportion to the number of key operations and elapsed time respectively, and means to limit the period of operations to the period required for the maximum movement of the time shutter.

F. W. NICHOL.